United States Patent
Yao

(10) Patent No.: US 8,422,882 B1
(45) Date of Patent: Apr. 16, 2013

(54) MONITORING POLARIZATION-MODE DISPERSION AND SIGNAL-TO-NOISE RATIO IN OPTICAL SIGNALS BASED ON POLARIZATION ANALYSIS

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 902 days.

(21) Appl. No.: 12/359,095

(22) Filed: Jan. 23, 2009

Related U.S. Application Data

(60) Provisional application No. 61/026,053, filed on Feb. 4, 2008.

(51) Int. Cl.
*H04B 10/08* (2006.01)

(52) U.S. Cl.
USPC ............... 398/29; 398/81; 398/147; 398/152

(58) Field of Classification Search ............. 398/29
See application file for complete search history.

(56) References Cited

U.S. PATENT DOCUMENTS

| | | |
|---|---|---|
| 3,302,028 A | 1/1967 | Sterzer |
| 3,684,350 A | 8/1972 | Wentz |
| 3,719,414 A | 3/1973 | Wentz |
| 4,389,090 A | 6/1983 | LeFevre |
| 4,461,543 A | 7/1984 | McMahon |
| 4,798,436 A | 1/1989 | Mortimore |
| 5,004,312 A | 4/1991 | Shimizu |
| 5,111,322 A | 5/1992 | Bergano et al. |
| 5,153,676 A | 10/1992 | Bergh |
| 5,251,057 A | 10/1993 | Guerin et al. |
| 5,317,445 A | 5/1994 | DeJule et al. |
| 5,373,393 A | 12/1994 | DeJule et al. |
| 5,381,250 A | 1/1995 | Meadows |
| 5,473,457 A | 12/1995 | Ono |
| 5,475,525 A | 12/1995 | Tournois et al. |
| 5,561,726 A | 10/1996 | Yao |
| 5,611,005 A | 3/1997 | Heismann et al. |
| 5,627,645 A | 5/1997 | Imagawa et al. |
| 5,723,856 A | 3/1998 | Yao et al. |
| 5,751,747 A | 5/1998 | Lutes et al. |
| 5,777,778 A | 7/1998 | Yao |
| 5,796,510 A | 8/1998 | Yao |
| 5,835,270 A | 11/1998 | Urino et al. |
| 5,917,179 A | 6/1999 | Yao |
| 5,929,430 A | 7/1999 | Yao et al. |
| 5,930,414 A | 7/1999 | Fishman et al. |
| 5,978,125 A | 11/1999 | Yao |
| 6,034,799 A * | 3/2000 | Hansen .......................... 398/1 |
| 6,178,036 B1 | 1/2001 | Yao |
| 6,181,728 B1 | 1/2001 | Cordingley et al. |
| 6,229,937 B1 | 5/2001 | Nolan et al. |

(Continued)

OTHER PUBLICATIONS

Damask, J.N., "A Programmable Polarization-Mode Dispersion Emulator for Systematic Testing of 10 Gb/s PMD Compensators," *Optical Fiber Communication Conference*, vol. 3, pp. 28-30, Mar. 2000.

(Continued)

*Primary Examiner* — Xinning Niu
(74) *Attorney, Agent, or Firm* — Perkins Coie LLP

(57) ABSTRACT

Techniques, devices and applications are provided for monitoring a polarization mode dispersion (PMD) effect in an optical signal.

14 Claims, 3 Drawing Sheets

U.S. PATENT DOCUMENTS

| | | | |
|---|---|---|---|
| 6,252,711 B1 | 6/2001 | Damask et al. |
| 6,339,489 B1 | 1/2002 | Bruyere et al. |
| 6,377,719 B1 | 4/2002 | Damask |
| 6,388,785 B2 | 5/2002 | Havstad et al. |
| 6,389,197 B1 | 5/2002 | Ilchenko et al. |
| 6,417,948 B1 | 7/2002 | Chowdhury et al. |
| 6,417,957 B1 | 7/2002 | Yao |
| 6,473,218 B1 | 10/2002 | Maleki et al. |
| 6,476,959 B2 | 11/2002 | Yao |
| 6,480,637 B1 | 11/2002 | Yao |
| 6,487,233 B2 | 11/2002 | Maleki et al. |
| 6,487,336 B1 | 11/2002 | Yao |
| 6,488,861 B2 | 12/2002 | Iltchenko et al. |
| 6,493,116 B1 | 12/2002 | Robinson et al. |
| 6,493,474 B1 | 12/2002 | Yao |
| 6,498,869 B1 | 12/2002 | Yao |
| 6,535,328 B2 | 3/2003 | Yao |
| 6,542,650 B2 | 4/2003 | Khosravani et al. |
| 6,546,159 B1 | 4/2003 | Peng et al. |
| 6,552,833 B2 | 4/2003 | Liu et al. |
| 6,567,167 B1 | 5/2003 | Chou et al. |
| 6,567,436 B1 | 5/2003 | Yao et al. |
| 6,576,886 B1 | 6/2003 | Yao |
| 6,577,445 B1 | 6/2003 | Damask |
| 6,580,532 B1 | 6/2003 | Yao et al. |
| 6,594,061 B2 | 7/2003 | Huang et al. |
| 6,604,871 B2 | 8/2003 | Cao |
| 6,628,850 B1 | 9/2003 | Yao |
| 6,628,861 B1 | 9/2003 | Yao |
| 6,628,862 B1 | 9/2003 | Yao |
| 6,643,064 B2 | 11/2003 | Huang et al. |
| 6,661,941 B1 | 12/2003 | Yao |
| 6,671,464 B1 | 12/2003 | Kikuchi |
| 6,687,423 B1 | 2/2004 | Yao |
| 6,707,977 B2 | 3/2004 | Chien et al. |
| 6,731,389 B2 | 5/2004 | Luscombe et al. |
| 6,754,404 B2 | 6/2004 | Yao |
| 6,795,481 B2 | 9/2004 | Maleki et al. |
| 6,795,616 B2 | 9/2004 | Yao |
| 6,836,327 B1 | 12/2004 | Yao |
| 6,842,283 B2 | 1/2005 | Savory et al. |
| 6,847,484 B2 | 1/2005 | Damask et al. |
| 6,856,400 B1 | 2/2005 | Froggatt |
| 6,867,918 B2 | 3/2005 | Damask |
| 6,873,631 B2 | 3/2005 | Yao et al. |
| 6,873,783 B1 | 3/2005 | Yao |
| RE38,735 E | 5/2005 | Yao |
| 6,891,616 B2 | 5/2005 | Saitoh et al. |
| 6,891,674 B2 | 5/2005 | Damask |
| 6,900,932 B2 | 5/2005 | Chen et al. |
| 6,937,798 B1 | 8/2005 | Yao et al. |
| 6,944,362 B2 * | 9/2005 | Jasti ................................. 385/16 |
| RE38,809 E | 10/2005 | Yao |
| 6,975,454 B1 | 12/2005 | Yan et al. |
| 7,027,135 B2 | 4/2006 | Fu et al. |
| 7,027,198 B2 | 4/2006 | Yao |
| 7,035,538 B2 * | 4/2006 | Willner et al. .................. 398/29 |
| 7,067,795 B1 | 6/2006 | Yan et al. |
| 7,068,896 B1 | 6/2006 | Kath et al. |
| 7,076,169 B2 | 7/2006 | Shpantzer et al. |
| 7,079,247 B2 | 7/2006 | Shribak et al. |
| 7,154,659 B1 | 12/2006 | Yao et al. |
| 7,157,687 B1 | 1/2007 | Yao |
| 7,209,670 B2 * | 4/2007 | Fludger et al. ................ 398/205 |
| 7,218,436 B2 | 5/2007 | Yao |
| 7,227,686 B1 | 6/2007 | Yan et al. |
| 7,233,720 B2 | 6/2007 | Yao |
| 7,245,952 B2 | 7/2007 | Cameron |
| 7,265,836 B1 | 9/2007 | Yao |
| 7,265,837 B1 | 9/2007 | Yao |
| 7,301,632 B2 | 11/2007 | Hug |
| 7,343,100 B2 | 3/2008 | Yao |
| 7,372,568 B1 | 5/2008 | Yao |
| 7,382,962 B1 | 6/2008 | Yao |
| 7,391,977 B2 | 6/2008 | Yao |
| 7,436,569 B2 | 10/2008 | Yao et al. |
| 7,466,471 B2 | 12/2008 | Yao |
| 7,522,785 B2 | 4/2009 | Yao |
| 7,534,990 B2 | 5/2009 | Yao |
| 7,535,639 B2 | 5/2009 | Yao et al. |
| 7,693,419 B1 | 4/2010 | Chen et al. |
| 7,796,894 B1 | 9/2010 | Yao |
| 2001/0052981 A1 | 12/2001 | Chung et al. |
| 2002/0015547 A1 | 2/2002 | Patel |
| 2002/0075477 A1 | 6/2002 | Yu et al. |
| 2002/0191265 A1 | 12/2002 | LaGasse et al. |
| 2003/0007151 A1 | 1/2003 | Eckert |
| 2003/0035120 A1 | 2/2003 | Myatt et al. |
| 2003/0076588 A1 | 4/2003 | Savory et al. |
| 2003/0081874 A1 | 5/2003 | Yao |
| 2003/0156776 A1 | 8/2003 | Han et al. |
| 2003/0206689 A1 | 11/2003 | Jung et al. |
| 2004/0037495 A1 | 2/2004 | Yao |
| 2004/0247226 A1 | 12/2004 | Pyo et al. |
| 2005/0041922 A1 | 2/2005 | Yao |
| 2005/0129346 A1 | 6/2005 | Chen et al. |
| 2005/0168659 A1 | 8/2005 | Melton |
| 2005/0200941 A1 | 9/2005 | Yao |
| 2005/0201751 A1 * | 9/2005 | Yao ................................. 398/26 |
| 2005/0265728 A1 | 12/2005 | Yao |
| 2006/0023987 A1 | 2/2006 | Yao |
| 2006/0115199 A1 | 6/2006 | Yao |
| 2006/0245706 A1 | 11/2006 | Kath et al. |
| 2007/0223078 A1 | 9/2007 | Yao et al. |
| 2007/0297054 A1 | 12/2007 | Yao et al. |
| 2008/0030839 A1 | 2/2008 | Yao |
| 2008/0054160 A1 | 3/2008 | Yao |
| 2008/0138070 A1 | 6/2008 | Yan et al. |
| 2008/0159692 A1 | 7/2008 | Yao |
| 2009/0028565 A1 | 1/2009 | Yao |
| 2009/0207409 A1 | 8/2009 | Yao |
| 2009/0213453 A1 | 8/2009 | Yao |
| 2009/0225420 A1 | 9/2009 | Yao et al. |
| 2009/0238218 A1 | 9/2009 | Yao |
| 2010/0239245 A1 | 9/2010 | Yao |

OTHER PUBLICATIONS

Damask, J.N., et al., "Demonstration of a Coherent PMD Source," *IEEE Photonics Technology Letters*, 15(11):1612-1614, Nov. 2003.

Foschini, G.J., et al., "Probability Densities of Second-Order Polarization Mode Dispersion Including Polarization Dependent Chromatic Fiber Dispersion," *IEEE Photonics Technology Letters*, 12(3):293-295, Mar. 2000.

Hauer, M.C., et al., "Electrically Controllable All-Fiber PMD Emulator Using a Compact Array of Thin-Film Microheaters," *Journal of Lightwave Technology*, 22(4):1059-1065, Apr. 2004.

Karlsson, M., et al., "Autocorrelation function of the polarization-mode dispersion vector," *Optics Letters*, 24(14):939-941, Jul. 1999.

Kogelnik, H., et al., *Optical Fiber Telecommunications IV B Systems and Impairments*, Chapter 15 "Polarization-Mode Dispersion", pp. 725-861, I.P. Kaminow and T. Li, Eds. Academic Press, 2002.

Lee, J.H., et al., "Statistical PMD Emulator Using Variable DGD Elements," *Optical Communication Conference and Exhibit*, OFC 2002, pp. 375-376, Mar. 2002.

Lima, I.T., et al., "Comparison of Polarization Mode Dispersion Emulators," *Journal of Lightwave Technology*, 19(12):1872-1881, Dec. 2001.

Noé, R., et al., "Polarization Mode Dispersion Compensation at 10, 20, and 40 Gb/s with Various Optical Equalizers," *Journal of Lightwave Technology*, 17(9):1602-1616, Sep. 1999.

Willner, A.E., et al., "PMD Emulation," *Journal of Optical and Fiber Communications Research*, 1(3):181-200, Nov. 2004.

Yan, L.-S., et al., "Polarization-Mode-Dispersion Emulator Using Variable Differential-Group-Delay (DGD) Elements and Its Use for Experimental Importance Sampling," *Journal of Lightwave Technolology*, 22(4):1051-1058, Apr. 2004.

Azzam, R.M.A., "Photopolarimeter using two modulated optical rotators", *Optics Letters*, 1(5):181-183, Nov. 1977.

Chipman, R.A., *Handbook of Optics*, vol. II, Chapter 22-Polarimetry, 2nd Ed. M. Bass ed., McGraw-Hill, New York, 1995.

Collett, E., *Polarized Light in Fiber Optics*, Chapters 15-16, The PolaWave Group, New Jersey, 2003.

Compain, E., et al., "General and Self-Consistent Method for the Calibration of Polarization Modulators, Polarimeters, and Mueller-Matrix Ellipsometers", *Applied Optics*, 38(16):3490-3502, Jun. 1999.

De Martino, A., et al., "Optimized Mueller polarimeter with liquid crystals", *Optics Letters*, 28(8):616-618, Apr. 2003.

Goldstein, D.H., et al., "Error analysis of a Mueller matrix polarimeter", *J. Opt. Soc. Am. A*, 7(4):693-700, Apr. 1990.

Goldstein, D.H., *Polarized Light*, Chapter 29, 2nd Ed., Marcel Dekker, New York, 2003.

Khosravani, R., et al., "Time and Frequency Domain Characteristics of Polarization-Mode Dispersion Emulators," *IEEE Photonics Technology Letters*, 13(2):127-129, Feb. 2001.

Rochford, K.B., et al., "Accurate Interferometric Retardance Measurements," *Applied Optics*, 36(25):6473-6479, Sep. 1997.

Sobiski, D., et al., "Fast first-order PMD compensation with low insertion loss for 10Gbit/s system," *Electronics Letters*, 37(1):46-48, Jan. 2001.

Wang, S.X., et al., "Fast wavelength-parallel polarimeter for broadband optical networks", *Optics Letters*, 29(9):923-925, May 2004.

Williams, P., "Rotating-Polarizer Polarimeter for Accurate Retardance Measurement," *Applied Optics*, 36(25):6466-6472, Sep. 1997.

Williams, P., "Rotating-Wave-Plate Stokes Polarimeter for Differential Group Delay Measurements of Polarization-Mode Dispersion", *Applied Optics*, 38(31):6508-6515, Nov. 1999.

Yan, L.-S., et al., "Experimental Importance Sampling Using a 3-Section PMD Emulator with Programmable DGD Elements," *Optical Fiber Communications Conference* (*OFC* 2003), paper ThA4, 4 pages, Mar. 2003.

Yan, L.-S., et al., "High-Speed and Highly Repeatable Polarization-State Analyzer for 40-Gb/s System Performance Monitoring," *IEEE Photonics Technology Letters*, 18(4):643-645, Feb. 2006.

Yan, L.-S., et al., "High-Speed, Stable and Repeatable PMD Emulator with Tunable Statistics," *Optical Fiber Communication Conference* (*OFC* 2003), paper MF6, 5 pages, Mar. 2003.

Yao, X. S., et al., "Highly repeatable all-solid-state polarization-state generator", *Optics Letters*, 30(11):1324-1326, Jun. 2005.

Lima, A.O., et al., "Statistical Analysis of the Performance of PMD Compensators Using Multiple Importance Sampling," IEEE Photonics Technology Letters, 15(12):1716-1718, Dec. 2003.

\* cited by examiner

MONITORING POLARIZATION-MODE DISPERSION AND SIGNAL-TO-NOISE RATIO IN OPTICAL SIGNALS BASED ON POLARIZATION ANALYSIS

PRIORITY CLAIM

This document claims the benefits of U.S. Provisional Patent Application Ser. No. 61/026,053 entitled "REAL TIME PMD & SNR MONITORING BASED ON FAST POLARIZATION ANALYSIS" and filed on Feb. 4, 2008, the entire disclosure of which is incorporated by reference as part of the disclosure of this document.

BACKGROUND

This application relates to techniques, apparatus and systems for measuring signal properties of an optical signal, including optical polarization, polarization mode dispersion and signal-to-noise ratio.

Optical polarization is an important parameter of an optical signal in various optical systems. For example, in fiber optic communication systems, polarization-dependent effects in fibers and other devices, such as polarization-dependent loss (PDL) and polarization-mode dispersion (PMD), can have significant impacts on performance and proper operations of optical devices or systems. Hence, it may be desirable to measure and monitor the state of the polarization (SOP) and the degree of polarization (DOP) of an optical signal in these and other systems.

Optical signal-to-noise ratio (SNR) and differential group delay (DGD) of an optical signal are also important parameters for various optical devices and systems and hence monitoring of these parameters may be desirable under certain circumstances. For example, as the speed of optical wavelength division multiplexed (WDM) communication network increases to 40 Gb/s and beyond, the PMD effect of an optical transmission link need be measured and monitored to ensure transmission quality.

SUMMARY

Techniques, devices and applications are provided for monitoring a polarization mode dispersion (PMD) effect in an optical signal. In one implementation, a method for monitoring a PMD effect in an optical signal includes splitting an input optical signal with an input optical bandwidth into a first optical signal with a first optical bandwidth less than the input optical bandwidth and a second optical signal with a second optical bandwidth different from the first optical bandwidth; measuring a degree of polarization of the first optical signal and a degree of polarization of the second optical signal, respectively; and processing the measured degree of polarization of the first optical signal and the measured degree of polarization of the second optical signal to determine a depolarization factor of the input optical signal to reflect the PMD effect in the input optical signal and to determine an optical to signal noise ratio of the input optical signal.

In another implementation, a device for monitoring a PMD effect in an optical signal includes an optical coupler to split an input optical signal into a first optical signal in a first optical path and a second optical signal in a second, separate optical path; a first optical filter in the first optical path to filter the first optical signal to have a first optical bandwidth that is less than an input optical bandwidth of the input optical signal and is different from a second optical bandwidth of the second optical signal; a first optical detector coupled to the first optical path to measure a degree of polarization of the first optical signal after being filtered by the first optical filter; a second optical detector in the second optical path to measure a degree of polarization of the second optical signal; and a processing unit in communication with the first and second optical detectors to receive outputs of the first and second optical detectors. The processing unit processes the measured degree of polarization of the first optical signal and the measured degree of polarization of the second optical signal to determine a depolarization factor of the input optical signal to reflect the PMD effect in the input optical signal and to determine an optical to signal noise ratio of the input optical signal.

In yet another implementation, a device for monitoring a PMD effect in an optical signal includes a first optical path that transmits light; a second optical path that is separate from the first optical path and transmits light; a first optical switch coupled to a first end of the first optical path and a first end of the second optical path to switch an input optical signal received by the first optical switch into either the first optical path as a first optical signal or the second optical path as a second optical signal; a first optical filter in the first optical path to filter the first optical signal to have a first optical bandwidth that is less than an input optical bandwidth of the input optical signal received by the first optical switch and is different from a second optical bandwidth of the second optical signal; a second optical switch coupled to a second end of the first optical path and a second end of the second optical path to receive the first and second optical signals and to select either the first optical signal in the first optical path or the second optical signal in the second optical path as an optical output of the second optical switch; an optical detector coupled to receive the optical output of the second optical switch to measure a degree of polarization of the received optical output; and a processing unit in communication with the optical detector to receive output of the optical detector. The processing unit processes the measured degree of polarization of the first optical signal and the measured degree of polarization of the second optical signal to determine a depolarization factor of the input optical signal to reflect the PMD effect in the input optical signal and to determine an optical to signal noise ratio of the input optical signal.

These and other implementations of polarization stable lasers, the associated techniques and their application are described in greater detail in the drawings, the description and the claims.

DETAILED DESCRIPTION

This application describes examples for implementing PMD monitoring based on measuring the degree of polarization of the optical signal in an optical system.

Figure 1:
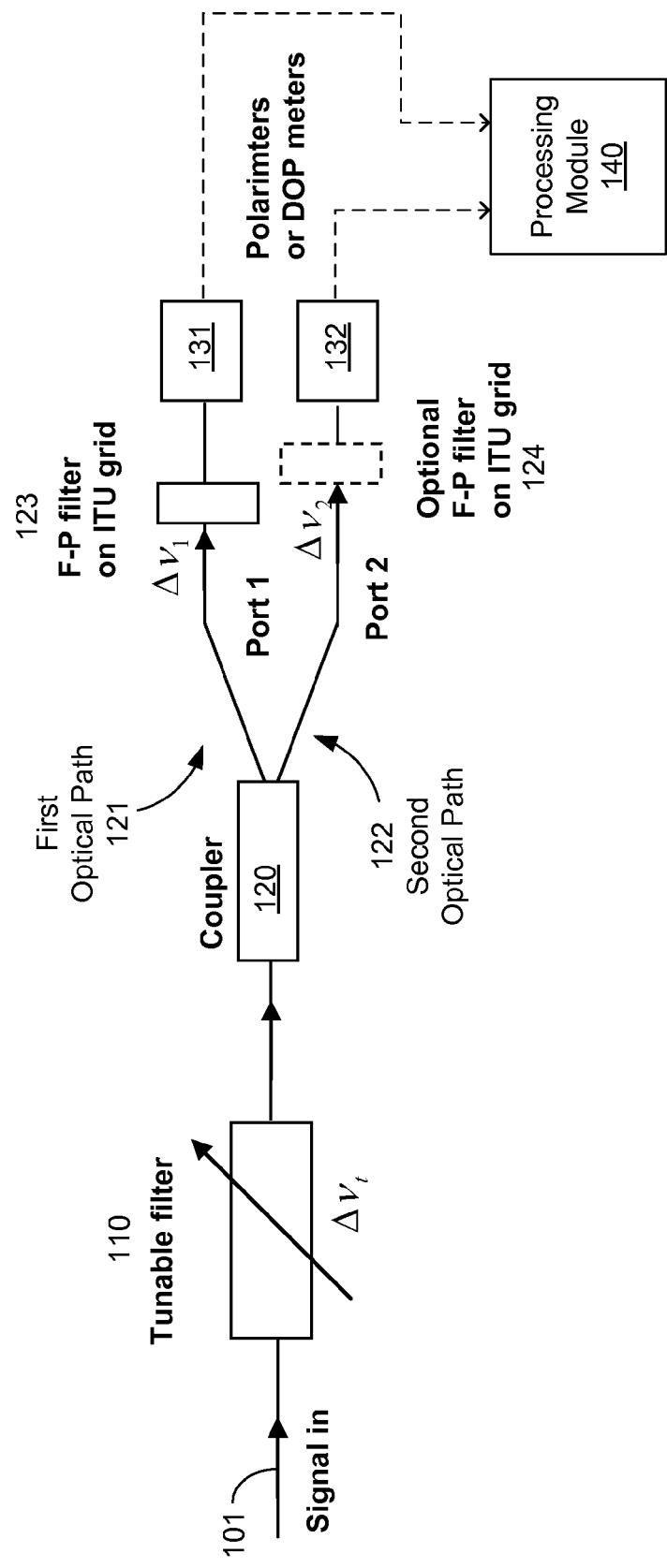
FIG. 1 shows one example of a PMD monitoring device based on measurements of the degree of polarization.

FIG. 1 shows one exemplary design for a PMD monitoring device. This PMD monitor includes an input tunable optical bandpass filter 110 to receive an input optical signal 101, an optical splitter 120 (e.g., a 1×2 coupler) connected downstream from the input tunable filter 110 to split the received light in the input signal 101 into two optical signals along two optical paths 121 and 122, respectively. A first optical bandpass filter 123, e.g., a Fabry-Perot (F-P) filter, has a transmission bandwidth smaller than that of the input tunable filter 110 and is placed in the first optical path 121 connected to one of the coupler output port (port 1 in FIG. 1) to filter the optical signal in the first optical path 121. A polarization detector 131 is placed at the end of the first optical path 121 to measure the polarization and the degree of polarization (DOP) of the filtered optical signal in the first optical path 121. Another polarization detector 132 is placed at the end of the second optical path 122 to measure the polarization and the degree of polarization (DOP) of the optical signal in the second optical path 122. The optical signals in the two optical paths 121 and 122 that reach the two respective detectors 131 and 132 have different signal spectral bandwidths. This can be achieved by placing the first optical bandpass filter 123 in the first optical path 121 while having no optical filter in the second optical path 122 or a second optical bandpass filter that has a transmission bandwidth different from that of the first optical bandpass filter 123. FIG. 1 shows this optional second optical bandpass filter 124 (e.g., a F-P filter) of a different bandwidth from the first optical bandpass filter 123 connected downstream from the other port of the coupler 120 in the second optical path 122. A processing module 140, which may be a digital processor or a microprocessor, is used to receive and process the measurements from the two detectors 131 and 132 and to produce the PMD and SNR measurements.

In measuring optical communication signals, the input tunable filter 110 can be calibrated against the WDM ITU grid under the WDM standards by the International Telecommunications Union (ITU) to align its center transmission frequency at an ITU WDM channel frequency to select one optical WDM channel in the input signal 101 at a time. Hence, the input tunable filter 110 is used to sequentially direct different optical WDM channels in the input signal 101 into the device for monitoring their PMD, one channel at a time. The transmission peak of the filter 123 or 124 in each of the two optical paths 121 and 122 is set at the WDM frequency of the selected optical WDM channel to filter the selected optical WDM channel. In one implementation, a filter for the filter 123 or 124 in each of the two optical paths 121 and 122 can be a tunable filter that tunes in synchronization with the tuning of the input filter 110. Alternatively, each of the first and second optical bandpass filters 123 and 124 can be a fixed filter that has multiple transmission peaks that respectively coincide with a set of adjacent WDM frequencies on the ITU grid of WDM systems and the free spectral range (FSR) or spacing between two adjacent transmission peaks each of the first and second optical bandpass filters 123 and 124 is set to be either the same as the channel spacing of the WDM system or less than the channel spacing by an integer fraction of the channel spacing so that the a WDM channel on the ITU grid can pass through each of the first and second optical bandpass filters 123 and 124. For example, if the channel spacing is 100 GHz, the free spectral range can be either 100 GHz or 50 GHz. For example, such a fixed filter for implementing the first and second optical bandpass filters 123 and 124 can be a fixed Fabry-Perot filter that has resonance transmission peaks that respectively coincide with the WDM frequencies on the ITU grid. As the input optical filter 110 is tuned to select a WDM channel from the input signal 101, the selected WDM channel coincides with one of the resonance transmission peaks of the filter 123 or 124, without tuning the filter 123 or 124, and thus transmits through the filter 123 or 124 after being filtered. This use of a fixed Fabry-Perot filter as the filter 123 or 124 can reduce the cost of the device in comparison with the design where a tunable filter is used to implement the filter 123 or 124.

Figure 2:
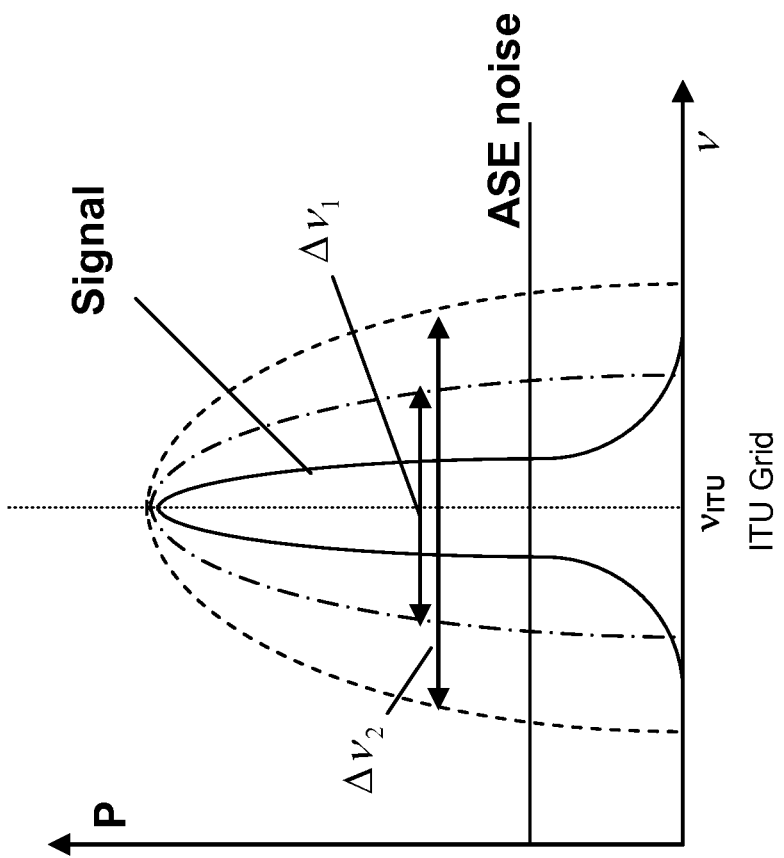
FIG. 2 shows spectra of optical signals in the device in FIG. 1 to illustrate one aspect of the operations of the device in FIG. 1.

The device in FIG. 1 is configured to make the transmission bandwidths of the optical signals in the two optical paths 121 and 122 sufficiently different from each other. FIG. 2 shows an example of the spectra of the two optical signals in the two optical paths 121 and 122. Hence, when both the first and second optical bandpass filters 123 and 124 are implemented, the transmission bandwidths of the optical bandpass filters 123 and 124 are set to be sufficiently different from each other and at least one of the optical bandpass filters 123 and 124 has a bandwidth less than that of the input tunable optical filter 110. In a configuration where the optional second optical bandpass filter 124 is not connected in the second optical path 122, the filter transmission function and the bandwidth in the second optical path 122 connected to the second port of the optical coupler 120 are effectively the same as those of the input tunable filter 110 and the first optical bandpass filter 123 is configured to have a bandwidth less than that of the input tunable filter 110. The polarization detector in each optical path can be a polarimeter or another device capable of measuring the DOP of light and thus is a DOP meter.

The operation of the device in FIG. 1 can be understood from the following analysis of processing for obtaining the PMD and SNR measurements from the output of the two detectors 131 and 132. The DOP of a light beam can be expressed as:

$$DOP = \frac{P_{pol}}{P_T}, \quad (1)$$

where $P_{pol}$ is the power of the polarized portion and $P_T$ is the total optical power. The total power $P_T$ received by each DOP meter 131 or 132 has two signal components: the signal power $P_s$ and the amplified spontaneous emission (ASE) power $P_{ASEi}$:

$$P_{Ti} = P_{ASEi} + P_s \quad (2)$$

where i=1, 2 for the two detectors 131 and 132 in the optical paths 121 and 122, respectively. Let $\rho(v)$ be the ASE power density of light after the input tunable filter 110, the ASE powers after the two bandpass filters 123 and 124 are:

$$P_{ASEi} = \int_{-\infty}^{\infty} \rho(v) f_i(v) dv = \overline{\rho} \Delta v_i, \quad (3)$$

where $P_{ASEi}$ is the ASE power in port i and $\overline{\rho}$ is the average ASE power density, $f_i(v)$ and $\Delta v_i$ are the transmission function and bandwidth of the respective optical bandpass filter 123 or 124 in port i. The total power in port i is:

$$P_{Ti} = P_{ASEi} + P_s = \overline{\rho} \Delta v_i \quad (4)$$

The total signal power of the input signal 101 has two portions based on the optical polarization state: the polarized portion ($P_{pol}$) and the depolarized portion ($P_{dpol}$):

$$P_s = P_{pol} + P_{dpol} = (1-\alpha)P_s + \alpha P_s \quad (5)$$

$$P_{pol} = (1-\alpha)P_s \quad (6)$$

$$P_{dpol} = \alpha P_s \quad (7)$$

where α is the depolarization factor that characterizes the depolarization caused by PMD and other nonlinear effects. The depolarization caused by nonlinear effects tends to be much smaller than that caused by PMD in many practical systems and thus the PMD caused depolarization is dominant and is reflected by the depolarization factor $\alpha$. Hence, the DOP of light is affected by the noise in the light and the depolarization of the light.

The two optical paths 121 and 122 are designed to have different optical transmission bandwidths to obtain DOP parameters under two different signal transmission bandwidths. The DOP parameters of the two optical signals in the optical paths 121 and 122 into the two DOP meters 131 and 132 in FIG. 1 are respectively given by:

$$DOP_1 = \frac{P_{pol}}{P_{ASE1} + P_s} = \frac{(1-\alpha)P_s}{\bar{\rho}\Delta v_1 + P_s} \quad (8)$$

$$DOP_2 = \frac{P_{pol}}{P_{ASE2} + P_s} = \frac{(1-\alpha)P_s}{\bar{\rho}\Delta v_2 + P_s} \quad (9)$$

Solving Eqs. (8) and (9) yields:

$$\alpha = 1 - \frac{(\Delta v_1 - \Delta v_2)DOP_1 DOP_2}{DOP_1 \Delta v_1 - DOP_2 \Delta v_2} = 1 - \frac{\left(1 - \frac{\Delta v_2}{\Delta v_1}\right)DOP_2}{1 - \frac{\Delta v_2}{\Delta v_1}\frac{DOP_2}{DOP_1}} \quad (10)$$

Where $\Delta v_1$ is not equal to $\Delta v_2$. When the device in FIG. 1 does not use the optional optical bandpass filter 124 in the second optical path 122, the signal bandwidth $\Delta v_2$ of the signal reaching the detector 132 is the signal bandwidth of the bandwidth $\Delta v_t$ of the input tunable filter 110 and the $\Delta v_1$ is different from $\Delta v_t$. This ensures that the signal transmission bandwidths of the two signal paths 121 and 122 are different.

From Eq. (8) and Eq. (9), the signal power of the input signal 101 is given by:

$$P_s = \frac{DOP_i P_{ASEi}}{(1 - \alpha - DOP_i)} \quad (11)$$

Based on the above, the signal to noise ratio (SNR) of the input signal 101 with respect to the bandwidth of the ith optical bandpass filter is:

$$SNR_i = \frac{P_s}{P_{ASEi}} = \frac{DOP_i}{1 - \alpha - DOP_i} \quad (12)$$

In practice, the signal to noise ratio can be calculated from the noise in a spectral bandwidth of 0.1 nm. Therefore, the signal to noise ratio of the system is:

$$SNR = \frac{\Delta v_i}{0.1} SNR_i \quad (13)$$

where $\Delta v_i$ is expressed in nm.

As shown in Eq. (11)-Eq. (13), the apparatus in FIG. 1 can be used to simultaneously monitor the SNR and depolarization caused by PMD effect. Because the polarimeter or DOP meter (131 or 132) can also measure the power after the tunable optical filter 110, the optical power of each channel signal selected by the tunable optical filter 110 can also be determined.

Notably, the value of the depolarization factor $\alpha$ of the input signal 101 in FIG. 1 depends the total PMD of the system and the relative orientation of the polarization with respect to the principle state of polarization (PSP) of the fiber link. The depolarization factor $\alpha$, therefore, represents the total effect of PMD on the communication link. Because the polarization state can vary rapidly with time, e.g., faster than the PMD variation in general, in optical systems, a may vary accordingly. The difference between the maximum and minimum values of $\alpha$ is indicative of the total PMD. Therefore, the PMD value of the system can be estimated by obtaining the amplitude of the variation in $\alpha$ over a certain period of time, provided that the polarization variation during the period evenly covers the Poincare Sphere.

Figure 3:
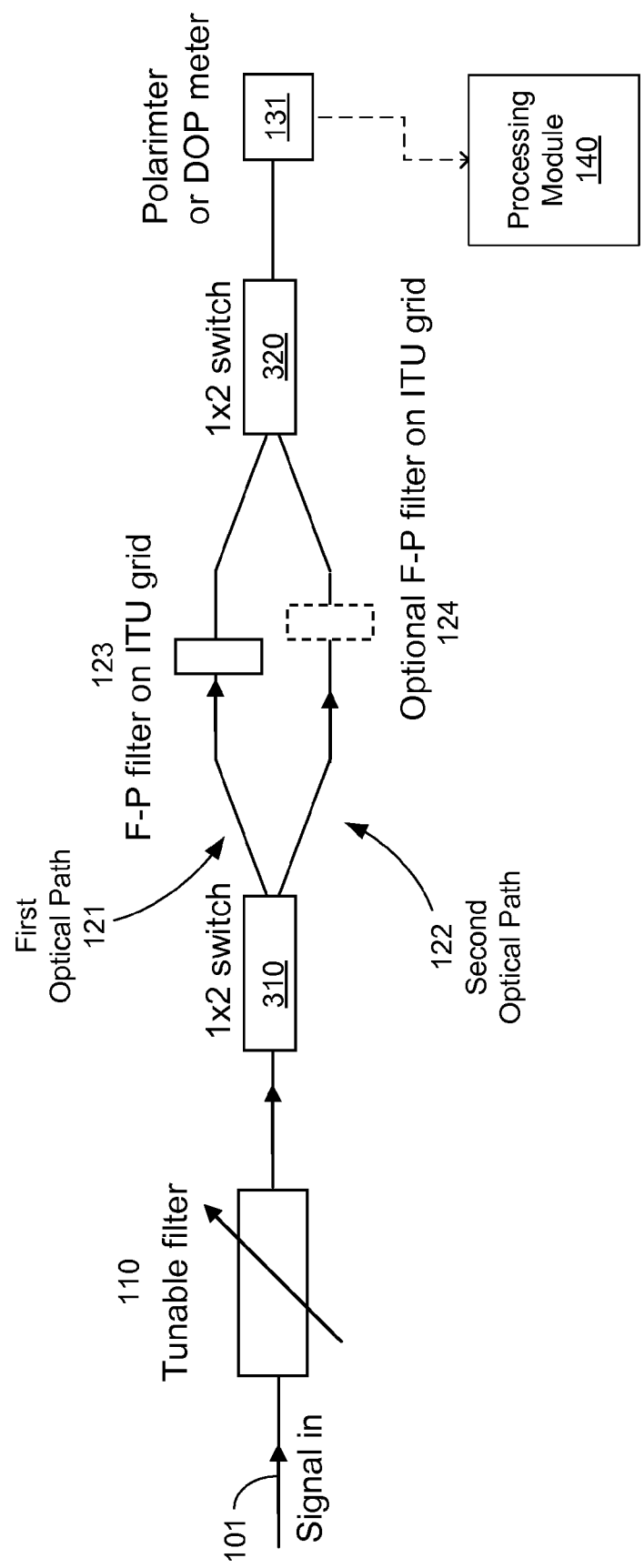
FIG. 3 shows another example of a PMD monitoring device based on measurements of the degree of polarization.

The device in FIG. 1 implements parallel processing of two signals filtered out of the input signal 101 with different bandwidths by using two DOP meters 131 and 132. Other FIG. 3 shows an example of a "sequential" monitoring device based on the similar mechanism used in FIG. 1. In FIG. 3, the optical coupler 120 in FIG. 1 is replaced by a first optical 1×2 switch 310 connected downstream from the tunable optical filter 110, and a second 1×2 optical switch 320 is connected to the ends of the two optical paths 121 and 122 to combine the optical signals from the two optical paths 121 and 122 into a combined optical signal. A single DOP meter 131 is coupled downstream from the second optical switch 320 to perform DOP measurements.

In operation, the first and second optical switches 310 and 320 at the beginning and end of the two optical paths 121 and 122 are synchronized in two switching states where, in the first switching state, the switches 310 direct light into the first optical path 121 and then to the DOP meter 131 and the second optical path 122 is not used to route light; in the second switching state, the switches 310 and 320 direct light into the second optical path 122 and to the DOP meter 131 and the first optical path 121 is not used to route light. Hence, the DOP measurements on the two optical signals in two optical paths 121 and 122 are measured by the single DOP meter 131 in sequence at different times. This configuration works when the polarization change in the system is slower than the switching speed of the switches 310 and 320. Other aspects of the processing and operations of the device in FIG. 3 are similar to the device in FIG. 1.

Therefore, the above described techniques and devices in FIGS. 1-3 can be used to simultaneously monitor SNR, PMD effect via the depolarization factor and the channel power. Such simultaneous measurements can be useful in optical communications. For example, when a system experiences an outage, the network operator can analyze the measurements of SNR, PMD and channel power obtained from a monitoring device based on the present techniques and identify the problem which can be caused by a severe PMD effect, a low channel power, or a unacceptably low SNR.

While this document contains many specifics, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations and enhancements of the disclosed implementations and other implementations can be made based on what is described and illustrated in this document.

What is claimed is:

1. A method for monitoring a polarization mode dispersion (PMD) effect in an optical signal, comprising:
   splitting an input optical signal with an input optical signal bandwidth into a first optical signal with a first optical signal bandwidth less than the input optical signal bandwidth and a second optical signal with a second optical signal bandwidth different from the first optical signal bandwidth, wherein the first optical signal and the second optical signal are centered at a common optical wavelength which is at a center of signal spectral bands of the first optical signal with the first optical signal bandwidth and the second optical signal with the second optical signal bandwidth;
   measuring a degree of polarization of the first optical signal and a degree of polarization of the second optical signal, respectively; and
   processing the measured degree of polarization of the first optical signal and the measured degree of polarization of the second optical signal to determine a depolarization factor of the input optical signal to reflect the PMD effect in the input optical signal and to determine an optical to signal noise ratio of the input optical signal.

2. The method as in claim 1, comprising:
   using an optical coupler to split the input optical signal into the first optical signal in a first optical path and the second optical signal in a second, separate optical path; and
   using a first detector in the first optical path to measure the degree of polarization of the first optical signal and a second detector in the second optical path to measure the degree of polarization of the second optical signal, respectively.

3. The method as in claim 1, comprising:
   using a first optical switch to switch the input optical signal as the first optical signal in a first optical path at one time and to switch the input optical signal as the second optical signal in a second, separate optical path at a different time;
   using a second optical switch coupled to the first and the second optical paths to switch the first optical signal in the first optical path into a common detector to measure the degree of polarization of the first optical signal when the first optical switch switches the input optical signal as the first optical signal into the first optical path; and
   using the second optical switch to switch the second optical signal in the second optical path into the common detector to measure the degree of polarization of the second optical signal when the first optical switch switches the input optical signal as the second optical signal into the second optical path.

4. The method as in claim 1, comprising:
   using an optical filter to filter one of the first and second optical signals to make the second optical bandwidth different from the first optical bandwidth.

5. The method as in claim 1, comprising:
   using a first optical filter to filter the first optical signal and a second optical filter to filter the second optical signal to make the first optical bandwidth of the first optical signal, after being filtered by the first optical filter, to be different from the second optical bandwidth of the second optical signal after being filtered by the second optical filter.

6. The method as in claim 1, comprising:
   using an input optical filter to filter the input optical signal before the splitting to produce a filtered input optical signal having spectral components in a transmission band of the input optical filter while rejecting other spectral components in the input optical signal; and
   downstream from the input optical filter, splitting the input optical signal into the first and second optical signals.

7. The method as in claim 6, wherein:
   the input optical filter is a bandpass filter centered at a wavelength division multiplexed (WDM) wavelength grid under a WDM standard by the International Telecommunications Union (ITU) to select one WDM channel in the input optical signal while rejecting other WDM channels.

8. The method as in claim 7, wherein:
   the input optical filter is a tunable bandpass filter, and
   the method comprises tuning the input optical filter to select one WDM channel to measure the depolarization factor and the optical to signal noise ratio of the selected WDM channel at a time and subsequently select another WDM channel to measure the depolarization factor and the optical to signal noise ratio of the subsequently selected another WDM channel.

9. The method as in claim 8, comprising:
   using a Fabry-Perot filter in an optical path of at least one of the first and second optical signals to perform optical filtering, wherein the Fabry-Perot filter has transmission resonance peaks that coincide with ITU WDM frequencies.

10. A device for monitoring a polarization mode dispersion (PMD) effect in an optical signal, comprising:
    a first optical path that transmits light;
    a second optical path that is separate from the first optical path and transmits light;
    a first optical switch coupled to a first end of the first optical path and a first end of the second optical path to switch an input optical signal received by the first optical switch into either the first optical path as a first optical signal or the second optical path as a second optical signal, wherein the first optical signal and the second optical signal are centered at a common optical wavelength;
    a first optical filter in the first optical path to filter the first optical signal to have a first optical signal bandwidth that is less than an input optical signal bandwidth of the input optical signal received by the first optical switch and is different from a second optical signal bandwidth of the second optical signal;
    a second optical switch coupled to a second end of the first optical path and a second end of the second optical path to receive the first and second optical signals and to select either the first optical signal in the first optical path or the second optical signal in the second optical path as an optical output of the second optical switch;
    an optical detector coupled to receive the optical output of the second optical switch to measure a degree of polarization of the received optical output; and
    a processing unit in communication with the optical detector to receive output of the optical detector, the processing unit processing the measured degree of polarization of the first optical signal and the measured degree of polarization of the second optical signal to determine a depolarization factor of the input optical signal to reflect the PMD effect in the input optical signal and to determine an optical to signal noise ratio of the input optical signal.

11. The device as in claim 10, comprising:
a second optical filter in the second optical path to filter the second optical signal to have the second optical bandwidth that is different from the first optical bandwidth of the first optical signal after being filtered by the first optical filter.

12. The device as in claim 10, comprising:
an input optical filter placed in the optical path of the input optical signal upstream to the first optical switch to filter the input optical signal to allow transmission of spectral components in a transmission band of the input optical filter while rejecting other spectral components in the input optical signal.

13. The device as in claim 12, wherein:
the input optical filter is a tunable bandpass filter to select one wavelength division multiplexed (WDM) optical channel in the input optical signal while rejecting other WDM optical channels; and
the first optical filter is a Fabry-Perot filter that has transmission resonance peaks that coincide with WDM frequencies under a WDM standard by the International Telecommunications Union (ITU).

14. The device as in claim 11, comprising:
a second optical filter in the second optical path to filter the second optical signal to have the second optical bandwidth that is different from the first optical bandwidth of the first optical signal after being filtered by the first optical filter.

* * * * *